(No Model.)

J. LIMING.
EYEGLASSES.

No. 478,616. Patented July 12, 1892.

Witnesses:
R. Schleicher
A. V. Groupe

Inventor:
John Liming
by his Attorneys
Howson & Howson

UNITED STATES PATENT OFFICE.

JOHN LIMING, OF MOUNT ALVERNO, PENNSYLVANIA.

EYEGLASSES.

SPECIFICATION forming part of Letters Patent No. 478,616, dated July 12, 1892.

Application filed March 28, 1892. Serial No. 426,722. (No model.)

*To all whom it may concern:*

Be it known that I, JOHN LIMING, a citizen of the United States, and a resident of Mount Alverno, Delaware county, Pennsylvania, have invented certain Improvements in Eyeglasses and Spectacles, of which the following is a specification.

The object of my invention is to permit wearers of spectacles or eyeglasses to obtain a view of objects in their rear, the device whereby this object is attained being also available for use in the treatment of certain diseases of the eye.

Figure 1:
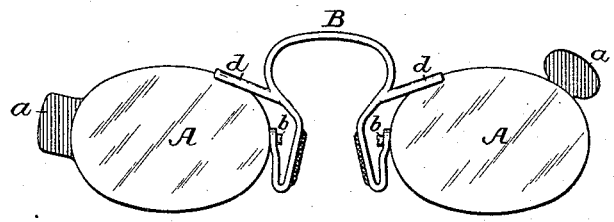
Figure 2:
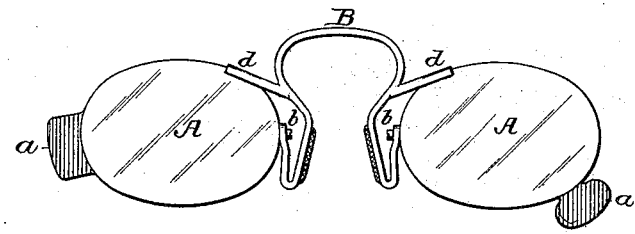

In the accompanying drawings, Figure 1 represents a view of a pair of eyeglasses constructed in accordance with my invention; and Fig. 2 is a similar view of the same, showing the lenses in different position.

The main feature of my invention consists in forming or mounting upon or attaching to either or both of the lenses or lens-frames of a pair of eyeglasses or spectacles one or more mirrors so located as to permit the wearer to obtain a view of objects in the rear, said mirror or mirrors being also in some cases of value in the treatment of certain diseases of the eye in which it is desirable to provide some object in such position that in looking at the same the eye will be turned in the direction necessary to bring certain desired muscles into play.

In the drawings I have shown a pair of eyeglasses having the usual lenses A A, connected by a nose-piece B, each lens having, also, on its outer rim a mirror $a$, that on one lens being on the upper rim some distance beyond the center of the lens and that of the other lens being at the end of the same. Either of the mirrors so placed will reflect objects in the rear of the person wearing the glasses; but it should be understood that my invention is not limited to any particular location of the lenses, for said lenses may even in some cases be located so as to not reflect objects in the rear. For instance, in the treatment of some diseases of the eye it may be desirable to direct the gaze to a particular point where a mirror will not reflect objects in the rear, the mirror in that case furnishing a bright object to which the gaze can be directed, so as to turn the eye to the desired position.

As shown in the drawings, the lenses A are pivoted to the upturned ends of the nose-piece B by means of small pins or screws $b$, so that each lens can be reversed top for bottom, as shown in Fig. 2, in order to change the position of the lenses and the mirrors thereon.

The nose-piece B has projecting wings or fingers $d$, bearing upon the tops of the lenses and serving to retain the same in the position to which they have been adjusted and to prevent any accidental shifting of the lenses from such position.

Although I have shown my invention as applied to eyeglasses, it will be evident that the mirrors can be used in connection with spectacles as well, and said mirrors may be formed by coating a portion of the lens itself or by projections on the lens or by separate pieces secured to the lenses or lens-frames.

The mirrors shown in the drawings are double-faced, so that they will present a reflecting-surface when in either position; but it will be evident that single-faced mirrors may be used when the lenses are fixed or the mirrors are to reflect when in but one of their positions. In all cases, however, the mirror when in its operative position should reflect rearwardly or toward the eye of the wearer of the glasses, and it should always be placed so as not to obstruct the direct forward vision through the lens.

I am aware that spectacles have been provided with a mirror attachment for reflecting light forward onto a newspaper or book, and also that opera-glasses and the like have been provided with a mirror to be placed at such an angle in front of the object-lens that it will reflect objects at one side or at the rear, but will obstruct direct forward vision through the lens. Hence I do not claim, broadly, the combination of a pair of eyeglasses or spectacles with a mirror; but

I claim and desire to secure by Letters Patent—

1. The combination of the lens of a pair of spectacles or eyeglasses with a mirror mounted so as to reflect objects in the rear of the wearer of the glasses, but offering no obstacle to direct forward vision through the lens, substantially as specified.

2. The combination of each of the lenses of a pair of spectacles or eyeglasses with a mirror mounted so as to reflect objects in the rear of the wearer of the glasses, but offering no obstacle to direct forward vision through the lenses, substantially as specified.

3. A pair of spectacles or eyeglasses having a mirror mounted beyond the periphery of either lens and facing rearward or toward the wearer of the glasses, substantially as specified.

4. The combination of a pair of spectacles or eyeglasses having a lens pivoted to the nose-piece so as to be reversed thereon with a mirror movable with said lens in its reversal, substantially as specified.

5. The combination of a pair of spectacles or eyeglasses having a lens pivoted to the nose-piece so as to be reversed thereon with a double-faced mirror movable with said lens in its reversal and showing a rearward-reflecting face in either of its positions, substantially as specified.

6. The combination of a pair of spectacles or eyeglasses having a lens pivoted to the nose-piece with a mirror upon the said lens and a retaining-finger for engagement with the lens to hold it in either of its positions, substantially as specified.

In testimony whereof I have signed my name to this specification in the presence of two subscribing witnesses.

JOHN LIMING.

Witnesses:
WILLIAM D. CONNER,
HARRY SMITH.